United States Patent
Wojno

(10) Patent No.: US 8,607,981 B2
(45) Date of Patent: Dec. 17, 2013

(54) GROCERY TRANSPORT REUSABLE CONTAINER

(71) Applicant: Christopher W Wojno, Huntington Beach, CA (US)

(72) Inventor: Christopher W Wojno, Huntington Beach, CA (US)

(73) Assignee: Christopher W Wojno, Huntington Beach, CA (US)

( * ) Notice: Subject to any disclaimer, the term of this patent is extended or adjusted under 35 U.S.C. 154(b) by 0 days.

(21) Appl. No.: 13/712,069

(22) Filed: Dec. 12, 2012

(65) Prior Publication Data

US 2013/0264242 A1    Oct. 10, 2013

Related U.S. Application Data

(60) Provisional application No. 61/620,589, filed on Apr. 5, 2012.

(51) Int. Cl.
    *B65D 21/02*    (2006.01)
(52) U.S. Cl.
    USPC ............ 206/503; 206/509; 206/507; 206/519
(58) Field of Classification Search
    USPC ......... 206/499, 203, 505, 507, 506, 509, 512, 206/510, 511, 515, 519, 520; 220/23.83, 220/23.86
    See application file for complete search history.

(56) References Cited

U.S. PATENT DOCUMENTS

| | | | | |
|---|---|---|---|---|
| RE26,350 E | * | 2/1968 | Wilson | 206/505 |
| 3,534,866 A | * | 10/1970 | Asenbauer | 211/126.2 |
| 4,011,948 A | * | 3/1977 | Rehrig et al. | 206/507 |
| 4,029,209 A | * | 6/1977 | Frahm et al. | 206/510 |
| 4,189,052 A | * | 2/1980 | Carroll et al. | 206/507 |
| 4,194,626 A | * | 3/1980 | Boller | 206/736 |
| 4,373,642 A | * | 2/1983 | Wolters et al. | 220/659 |
| 4,432,161 A | * | 2/1984 | de Bruin | 47/41.01 |
| 4,534,466 A | * | 8/1985 | Wood | 206/518 |
| 4,993,554 A | * | 2/1991 | Box | 206/507 |
| 5,469,986 A | * | 11/1995 | Jang | 220/762 |
| 5,577,613 A | * | 11/1996 | Laidlaw | 206/510 |
| 5,860,527 A | * | 1/1999 | Frankenberg et al. | 206/509 |
| 6,062,388 A | * | 5/2000 | Ohayon | 206/509 |
| 6,269,967 B1 | * | 8/2001 | de Vries | 220/669 |
| 6,394,274 B1 | * | 5/2002 | Cheeseman | 206/511 |
| 7,967,142 B2 | * | 6/2011 | Barbalho | 206/507 |
| 8,297,442 B1 | * | 10/2012 | Byron | 206/503 |
| 2006/0180491 A1 | * | 8/2006 | Zephir et al. | 206/507 |
| 2006/0196800 A1 | * | 9/2006 | Baltz | 206/509 |
| 2007/0144931 A1 | * | 6/2007 | McTavish et al. | 206/503 |
| 2010/0126896 A1 | * | 5/2010 | Barbalho | 206/505 |
| 2011/0262305 A1 | * | 10/2011 | Visinoni et al. | 422/68.1 |
| 2012/0132558 A1 | * | 5/2012 | Busch | 206/503 |
| 2012/0241350 A1 | * | 9/2012 | Stahl | 206/509 |
| 2012/0273381 A1 | * | 11/2012 | Ulmer et al. | 206/505 |

* cited by examiner

*Primary Examiner* — Steven A. Reynolds

(57) ABSTRACT

A grocery transport container that can be hung, having a bottom (20) includes two pairs of opposing peripheral walls (22), (24) that slope upwardly and outwardly. A top rim horizontal surface (32), and walls (24) having stacking protuberance (26) along the bottom edges and connect to the bottom (20) via the offset shoulder (28). The top rim horizontal surface (32) contains stacking protuberance interlock open cavity (48). The top rim vertical surface (36) contains a plurality of reinforcing ribs (42) that are shaped to accommodate a pair of opposing open through cavities (40) that project out through the top rim vertical surface (36) at both ends thereby enabling hanging. The top rim vertical surfaces (34) contain a plurality of reinforcing ribs (44) and reinforcing ribs with nesting standoff projections (46), the top rim vertical surfaces (34) and side walls (24) contain void spaces.

11 Claims, 6 Drawing Sheets

GROCERY TRANSPORT REUSABLE CONTAINER

CROSS-REFERENCE TO RELATED APPLICATIONS

This application claims the benefit of PPA Ser. No. 61/620,589 Filed Apr. 5, 2012 by the present inventor, which is incorporated by reference.

STATEMENT REGARDING FEDERALLY SPONSORED RESEARCH OR DEVELOPMENT

"Not Applicable"

Reference to Sequence Listing

"Not Applicable"

BACKGROUND OF THE INVENTION

1. Field of Endeavor

The present application relates generally to containers which are nestable and stackable with one another and, more specifically, to a container system wherein a plurality of like containers are provided with the means for hanging one or more individual or several nested containers from the top edge of a vertical object such as a shopping cart rim, and used for transporting groceries.

2. Description of Prior Art

Nestable and stackable containers come in many shapes and sizes and have various industrial, commercial, and domestic applications. Such containers are generally rectangular have four sides and a bottom, and often have handles positioned near the top of two opposing sides to facilitate carrying. However, nested containers occupying a shopping cart while shopping inhibit the full function and usable space in a cart. Stackable containers that require 180 degree orientation for stacking restrict contents of the lower container from protruding upwardly past the container above at any point, stackable containers that require 90 degree orientation for stacking require the upper container to protrude outwardly past the sides of the lower container consuming space around the containers preventing compact placement of containers side by side. Stacking containers that require lids or bails are more costly, difficult to use, store, clean and are difficult to separate from nested orientation in confined spaces.

Products in use today for transporting groceries from the market checkout counter to your vehicle are the disposable shopping bag made of paper or plastic. Paper and plastic bags tear easily, are usually not recycled, often require double bagging for heavy or jagged shaped items, continue to fill landfills, and continue to be a wind-blown nuisance. Reusable bags are difficult to hold open and fill, don't protect contents from crushing, cannot be stacked, contents spill or roll out, they are cumbersome, difficult to refold, difficult to store, and are difficult to keep clean.

Numerous nestable and stackable containers exist in the prior art. Typical of these that presently appears relevant:
U.S. Pat. No. 6,269,967
Inventor: Jef de Vries
Issued: Aug. 7, 2001
U.S. Pat. No. 4,027,796
Inventor: Sam M. Martin
Issued: Jun. 7, 1977
U.S. Pat. No. 4,426,001
Inventor: Edward L. Stahl
Issued: Jan. 17, 1984

While these containers may be suitable for the purposes for which they were designed, they would not be as suitable for the purposes of the present invention, as hereinafter described.

BRIEF SUMMARY OF THE INVENTION

In accordance with one embodiment a grocery container that is stackable and nestable, comprises a bottom four peripheral walls extending upwardly from the bottom, the four peripheral walls terminating at a top rim, the top rim contains handholds, stacking interlock open cavities and open through cavities along the underside to facilitate hanging of containers.

Advantages

Accordingly several advantages of one or more aspects are as follows: to provide containers that are indefinitely reusable, that are sturdy and protect their contents from damage, that stand up and open to facilitate filling, that have smooth interior washable sanitary surfaces, that nested inside one another for compact storage in ones vehicle for reuse at the marketplace, that can be easily stacked when filled, in a shopping cart or vehicle in a compact manner, that when stacked have open space on two sides this allows for tall narrow objects to protrude upwardly, that allow easy grasping and separation of nested containers, that can be hung from the rim outside a shopping cart until needed, that when they are retired they are readily recyclable and should not contribute to landfills, they can also be used for most other market goods such as office supplies and for storage of a wide variety of items at home or business. Other advantages of one or more aspects will be apparent from a consideration of the drawings and ensuing description.

DESCRIPTION OF THE REFERENCED NUMERALS

Figure 1:
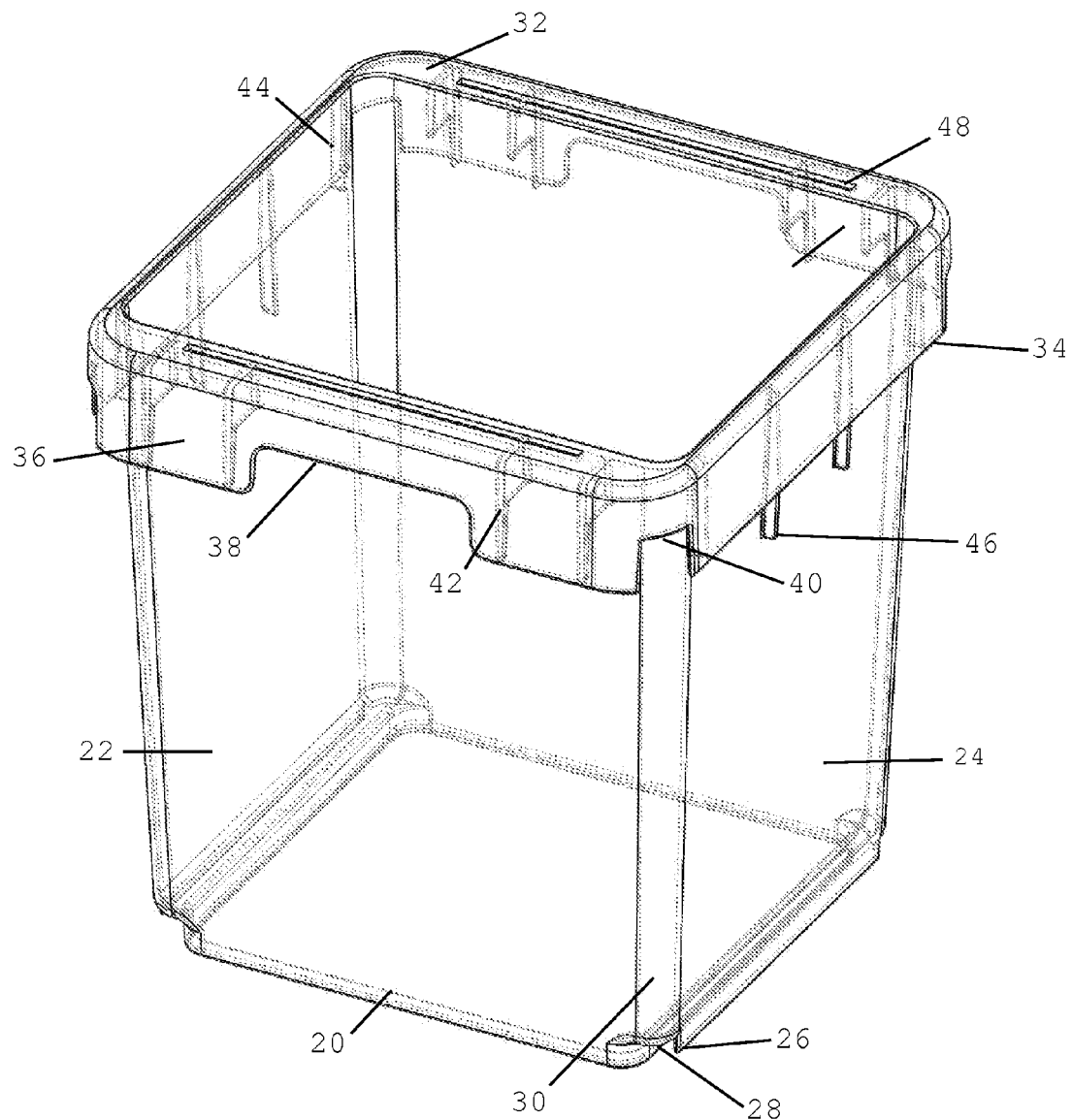
FIG. 1 shows a trimetric view of a container depicting its referenced features.
Figure 2:
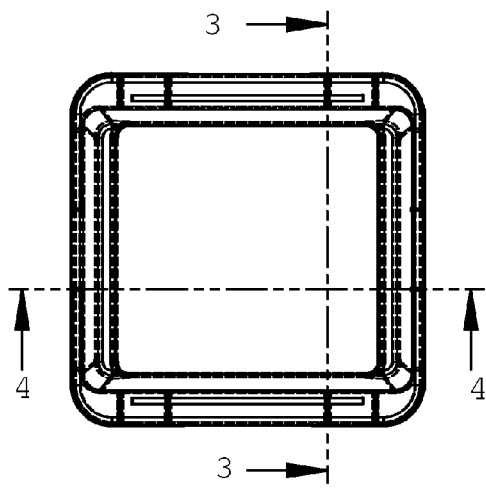
FIG. 2 shows a container plan view with sections along lines 3-3 and 4-4.
Figure 3:
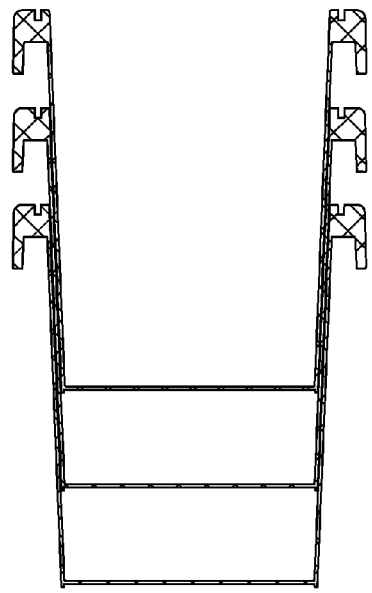
FIG. 3 shows the Section 3-3 and the open through cavity of the top rim vertical surface adjacent to the side walls.

20. Container bottom
22. Opposing side walls

24. Opposing end walls
26. Stacking protuberance
28. Offset shoulder
30. Radius wall corners
32. Top rim horizontal surface
34. Top rim vertical surface adjacent to the end walls
36. Top rim vertical surface adjacent to the side walls
38. Handhold
40. Open through cavity
42. Reinforcing rib with open through cavity
44. Reinforcing rib
46. Reinforcing rib with nesting standoff protuberance
48. Stacking interlock open cavity
50. Open area
52. Container lid
54. Data device compartment with view window [device of known type]

DETAILED DESCRIPTION OF THE INVENTION

One embodiment of the container is illustrated in FIG. 1 (trimetric view), the container is a pliable material such as polypropylene of known type, however the container can consist of many other materials for example: polyethylene, vinyl, nylon, rubber, various impregnated or laminated materials, various plasticized materials, cardboard, paper, etc. In one embodiment the container is produced by plastic injection molding. However the container can be produced by other methods for example: paper pulp vacuum-forming, plastic blow molding, plastic tumble molding etc.

The container is generally square along the perimeter of the top rim 32 and rectangular at the bottom 20 and includes two pairs of opposing peripheral walls 22, 24 that slope upwardly and outwardly. The side walls 22 connect directly to the bottom 20 and extend up to the wide top rim horizontal surface 32, the end walls 24 having stacking protuberance 26 along the bottom edges, these walls connect to the bottom 20 via the offset shoulder 28 and extend up to and are contiguous with the narrow top rim horizontal surface 32. A plurality of radius conical wall corners 30 connect all four walls 22, 24 at their respective vertical adjoining edges.

The top rim horizontal surface 32 projects outwardly a predetermined width from opposing walls 22 and contains stacking protuberance interlock open cavity 48. The top rim vertical surfaces 34 have radius top edges that are contiguous with the top edges of opposing end walls 24. The top rim vertical surfaces 36 have radius top edges that are contiguous with top rim horizontal surface 32.

The vertical surfaces 36 contain ergonomic handholds 38. The top rim vertical surfaces 36 and walls 22 are separated by open space that contain a plurality of reinforcing ribs 42 that are shaped to accommodate a pair of opposing open through cavities 40 that projects out through the top rim vertical surface 36 at both ends.

The top rim vertical surfaces 34 contain a plurality of reinforcing ribs 44 and reinforcing ribs with nesting standoff projections 46. The top rim vertical surfaces 34 contain void spaces between the inside face of the vertical surface and the outside face of the end walls 24.

Figure 15:
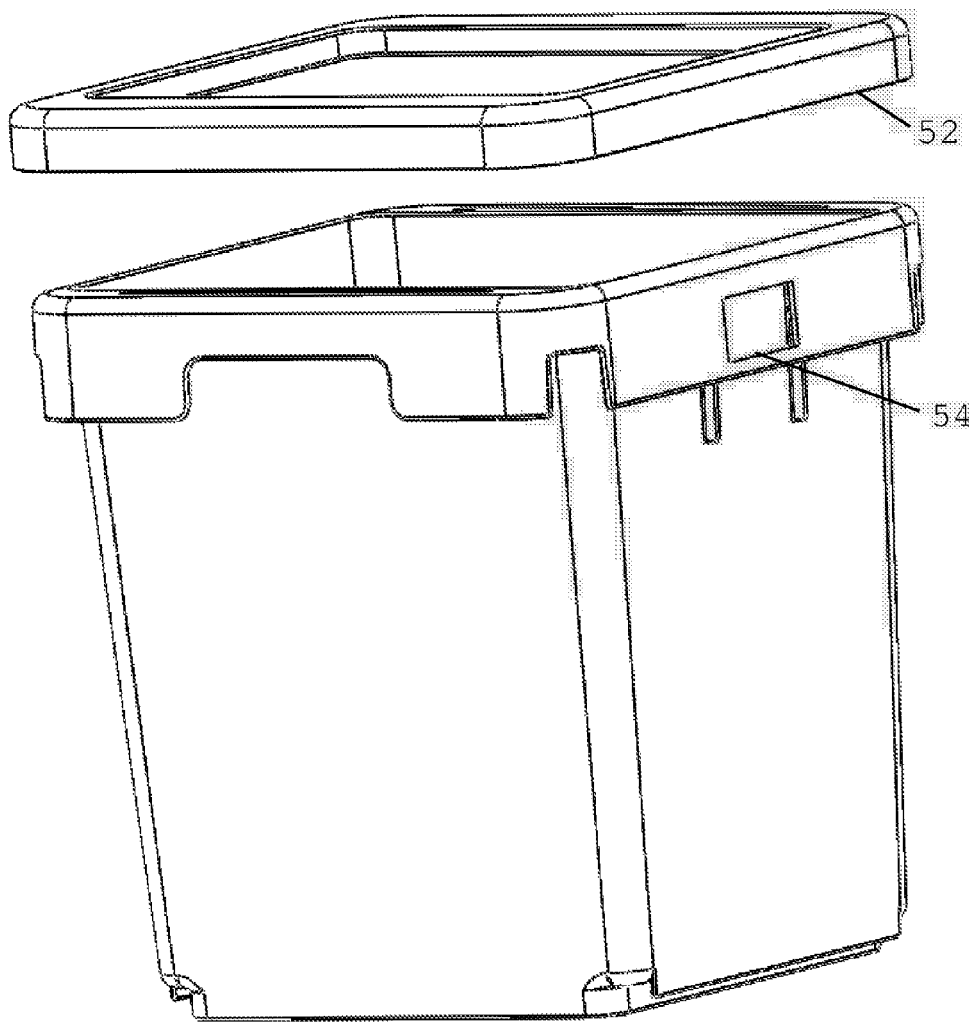
FIG. 15 shows a container with a data device compartment 54 and lid 52.

FIG. 15 shows a container lid 52 consisting of a top surface containing a downwardly projecting protuberance in the center that allows for the bottom of a like container to stack within this recessed area, and downwardly projecting peripheral walls, these walls rest along the outer top rim 32 in a friction fit manner FIG. 15 also shows a container with a data device compartment containing a view window 54 this compartment and window may contain a digital data device of a known type.

Operation

Figure 7:
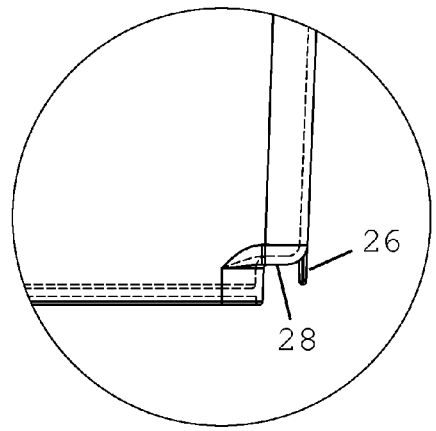
FIG. 7 shows an enlarged view of detail 7 from FIG. 6 with stacking Protuberance 26 and offset shoulder 28.
Figure 8:
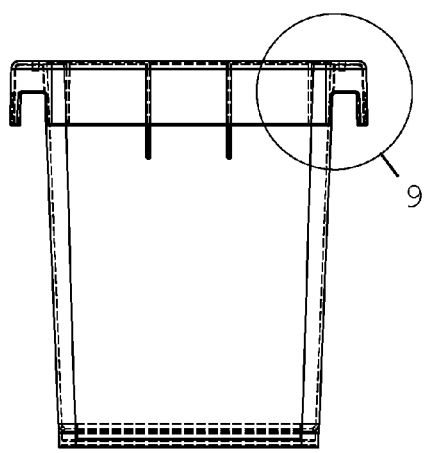
FIG. 8 shows a container elevation with detail 9.
Figure 9:
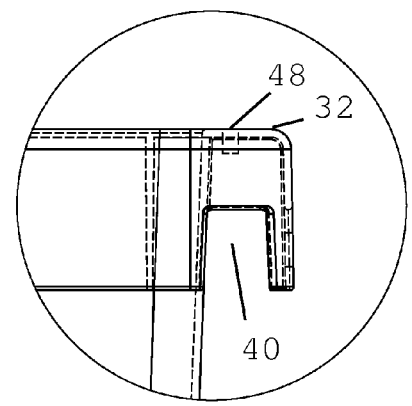
FIG. 9 shows an enlarged view of detail 9 from FIG. 8 with Stacking interlock open cavity 48 and Open through cavity 40.
Figure 11:
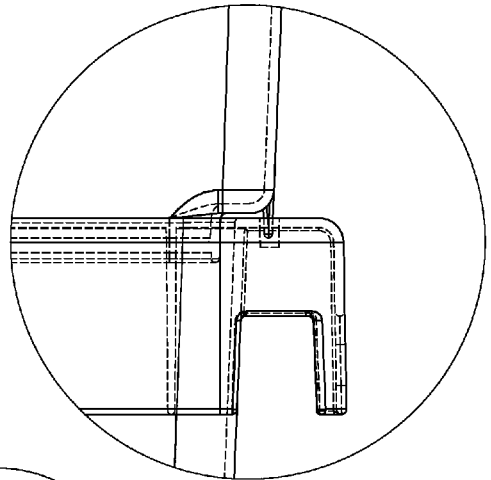
FIG. 11 shows an enlarged view of detail 11 from FIG. 10 showing the stacking interlock mating surfaces.
Figure 12:
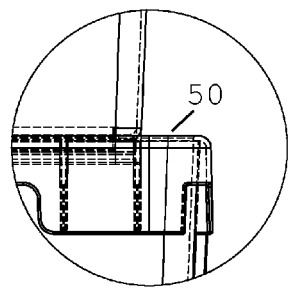
FIG. 12 shows an enlarged view of detail 12 from FIG. 10 showing the open area 50.
Figure 13:
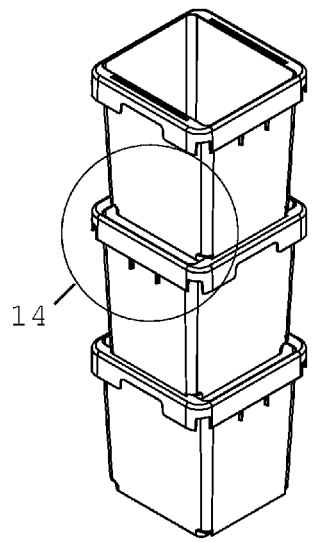
FIG. 13 shows an isometric view of three stacked containers with detail 14.

The manner of using the grocery transport reusable container is a container positioned 90 degrees to and directly above an identical container as shown in FIGS. 13 the offset shoulders 28 as shown in FIG. 7-9 rests upon the top rim horizontal surfaces 32 the stacking protuberance 26 protrude downwardly into stacking protuberance interlock open cavity 48 as shown in FIG. 11 providing a stable stacked configuration.

Figure 10:
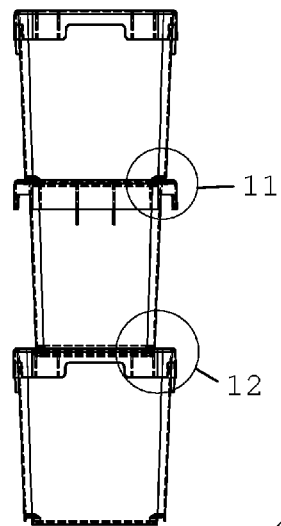
FIG. 10 shows an elevation of three containers in a stacked configuration with details 11, 12.
Figure 14:
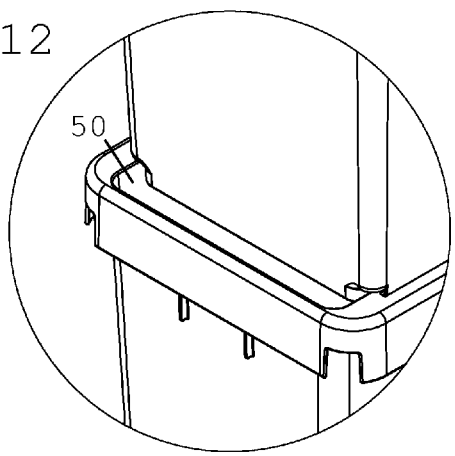
FIG. 14 shows an enlarged isometric view of detail 14 from FIG. 13 showing the open area 50.

FIGS. 13, 14 Show the open space along the two opposing end walls 24 of a lower container and the two opposing side walls 22 of the container above, these open spaces 50 allow for tall articles such as small items packaged with large paper back panels that often contain product information and also serves as a shoplifting deterrent, to protrude up from the bottom container along the side walls of the upper container without interfering with stacking, when stacked the containers occupy the same vertical space as a single container facilitating contiguous formations of stacked containers during transport as shown in FIG. 10.

Figure 4:
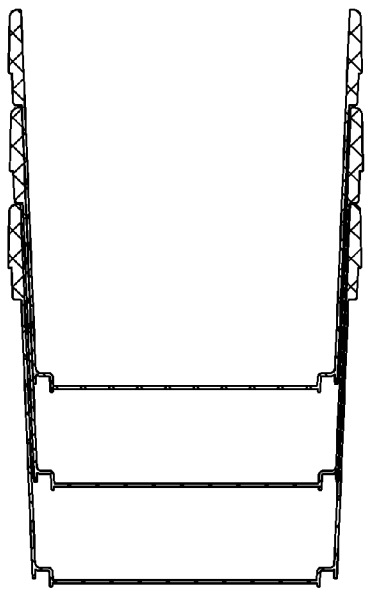
FIG. 4 shows the section 4-4 with reinforcing ribs with nesting standoff protuberance.
Figure 5:
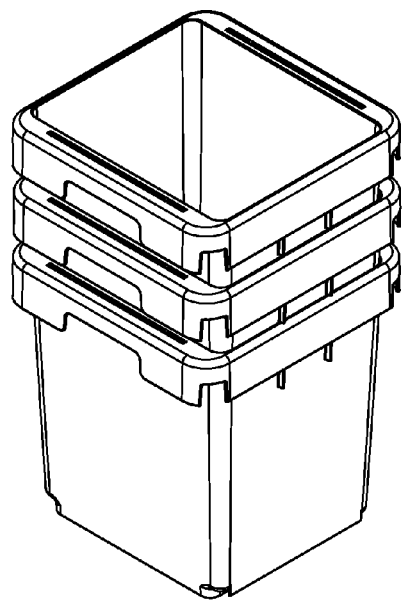
FIG. 5 shows three containers nested for compact storage.
Figure 6:
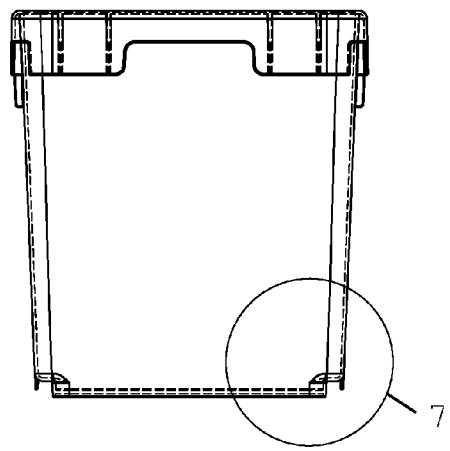
FIG. 6 shows a side elevation with detail 7.

Identical containers oriented in the same direction as shown in FIG. 5 can be nested compactly with one container substantially inserted into the open volume of another container. The reinforcing ribs with nesting standoff protuberance 46 shown in FIGS. 1, 4, 5 maintain an air gap separation between the walls of nested containers thereby facilitating easy separation of nested containers.

Figure 16:
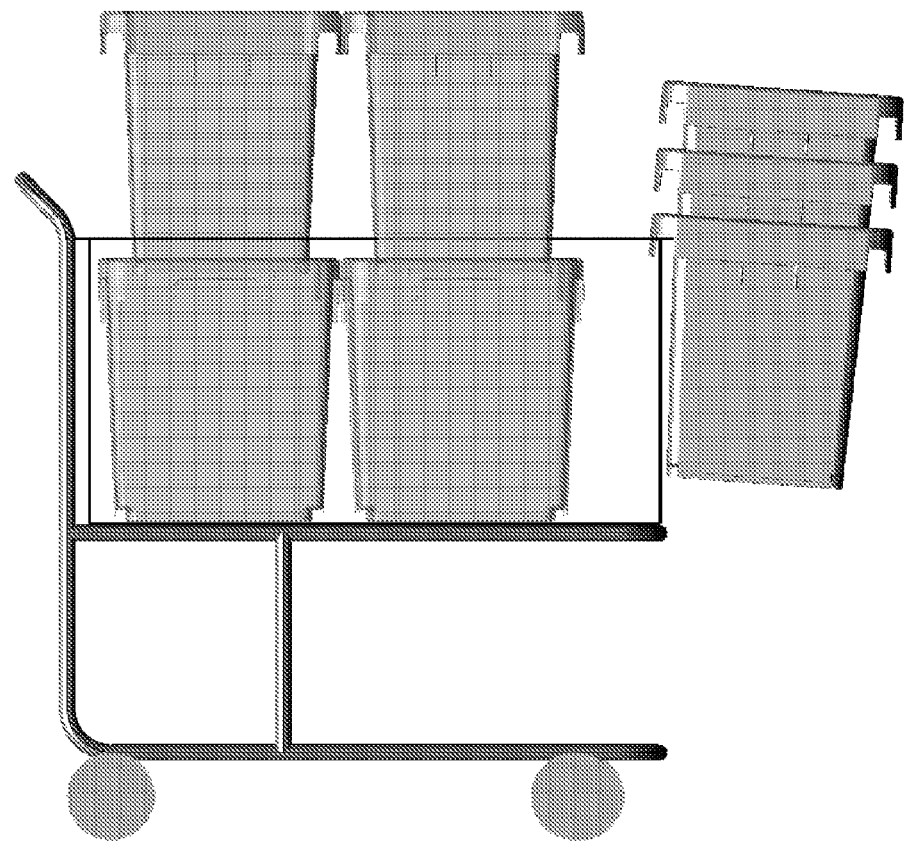
FIG. 16 is an illustrative view of several containers in use.

The open through cavities 40 shown in FIGS. 1, 9 provide a means for hanging of one or several nested containers from a vertical surface such as a shopping cart for example as shown in FIG. 16.

Conclusion, Ramifications, and Scope

Thus the reader will see that at least one embodiment of the grocery transport reusable container provides a more sustainable, ecologically conscientious, sanitary, functional, easy to use and versatile container that can be used by most people.

While my above description contains many specificities, these should not be construed as limitations on the scope, but rather as an exemplification of one embodiment thereof. Many other variations are possible, For example the method of manufacture; molded one-piece or separate multiple parts, the size, the color, the opacity, other materials such as; metal, material thickness, surface patterns or artwork, addition of bails or handles, dividers, liners, insolated liners, additional or fewer reinforcing ribs or contours, drain holes or slots, addition of radio frequency or other data or similar devices, or a disposable version. Accordingly, the scope should be determined not by the embodiment illustrated, but by the appended claims and their legal equivalents.

I claim:
1. A container comprising:
a bottom having two opposed side edges and two opposed end edges;
a pair of opposed sidewalls extending upwardly and outwardly from said bottom side edges;
a pair of opposed linear offset shoulders extending upwardly and outwardly from the bottom end edges and extending out to downwardly projecting stacking protuberances;

a pair of opposed end walls including said downwardly projecting stacking protuberances extending upwardly and outwardly from said offset shoulders;

a plurality of radius wall corners that connect the sidewalls and end walls at their respective intersections;

a top rim horizontal surface that is substantially planar, smooth and parallel to said bottom projecting outwardly a predetermined distance from upper edges of the side walls providing ergonomic hand clearance under and along the full length of said top rim horizontal surface;

a pair of opposed top rim vertical surfaces adjacent to said sidewalls that are substantially planar, smooth and perpendicular to said top rim horizontal surface connected to and projecting downwardly a predetermined length from said top rim horizontal surface providing a channel for ergonomic grasping along their entire lengths;

a pair of opposed top rim vertical surfaces adjacent to the end walls that are substantially planar, smooth and perpendicular to said top rim horizontal surface connected to and projecting downwardly from upper edge of said end walls a sufficient distance to provide a labeling surface that remains visible when a plurality of containers are in a nested configuration;

a pair of opposing open through cavities located in-between said top rim planar vertical surface adjacent to said sidewalls and said side walls that project out through radius top rim corners of sufficient girth, depth and a number of reinforcing ribs to support said container and contents when only one said open through cavity is hung from a single vertical surface;

the pair of opposing stacking protuberances are substantially planar and project downwardly a predetermined length along the full length of the bottom edge of said end walls providing open cavities between said linear offset shoulders and said stacking protuberances; and a pair of opposing stacking interlock open cavities are set in said top rim horizontal surface at a distance corresponding to said stacking protuberances.

2. The container of claim 1 wherein said stacking protuberances fully engage and protrude through said stacking protuberance interlock open cavities preventing an upper container from sliding down into a lower container or moving side to side when said containers are stacked.

3. The container of claim 1 wherein said stacking protuberance interlock open cavities are a corresponding length to said stacking protuberances, are substantially centered along the length of said top rim horizontal surface, are open through said top rim horizontal surface alleviating collection of soil and moisture within these interlock open cavities and further provide for an upper stacked identical container from moving in any direction excluding up.

4. The container of claim 1 further including two opposing ergonomic open contoured handholds substantially centered in said top rim vertical surfaces providing ergonomic grasping that remain accessible when a plurality of like containers are in a nested configuration.

5. The container of claim 1 further including a first means for stacking said container on top of an identical container without damaging the contents of the lower container when said container is rotated 90 degrees whereas the stacking protuberances protrude into and through said interlock open cavities therein held captive externally from the usable inner volume of the lower container thus providing for a plurality of containers to be securely stacked while occupying the same horizontal area as the lower container.

6. The container of claim 1 further including a second means for stacking said containers whereas a lower container and an upper like container oriented in the same direction rest substantially inside the lower container providing compact nesting of the containers while keeping said ergonomic open contoured handholds readily accessible and the said labeling surface visible.

7. The container of claim 1 further including a third means for stacking said containers whereas the stacking protuberances and the offset shoulders of one or more upper containers when positioned above the end walls of at least two lower said containers with the lower said containers spaced apart a distance equal to the width of the upper said container's said stacking protuberances thus forming a pyramid configuration that provides full continuous access to the inner volume of all the stacked said containers.

8. The container of claim 1 wherein said top rim vertical surfaces include a plurality of reinforcing ribs of a contoured shape containing notches to receive said stacking protuberances that maintain structural integrity of the said top rim across said stacking protuberance interlock open cavities while providing clearance for said open through cavities.

9. The container of claim 1 wherein the said top rim has four radius corners of a predetermined radius that provides full function of the said open through cavities while maintaining a minimum overall circumference enabling several containers to be fitted in a cart consisting of side and end walls of unequal dimensions.

10. The container of claim 1 wherein interior surfaces are smooth.

11. A method of transporting groceries, comprising:

providing several containers as defined in claim 1, (b) providing a shopping cart containing a plurality of said containers in a nested arrangement, positioned with said open through cavity over the rim of said shopping cart, (c) distributing said containers throughout said cart and inserting grocery items into said containers, (d) distributing a second layer of said containers rotated 90 degrees from the containers already positioned therein with said stacking protuberance protruding downwardly into said stacking protuberance interlock open cavities, providing a stable stacked configuration and inserting grocery items into said second layer of said containers, whereby said containers can be transported to ones vehicle via said cart.

* * * * *